Jan. 1, 1929.
F. J. LEATHER
1,697,073
HOOD FOR AUTOMOBILES AND OTHER VEHICLES
Filed July 16, 1926
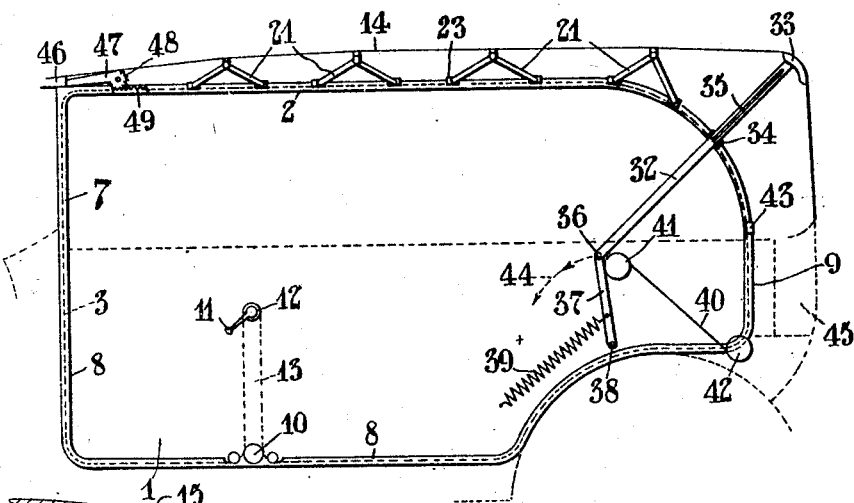
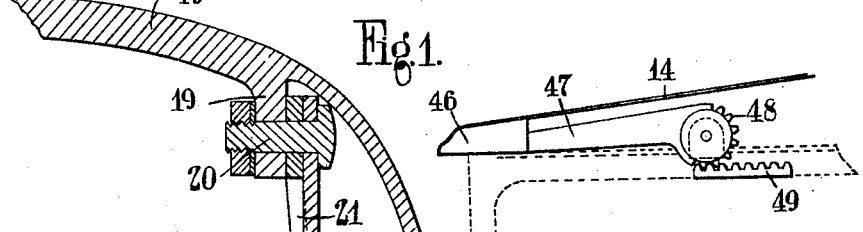
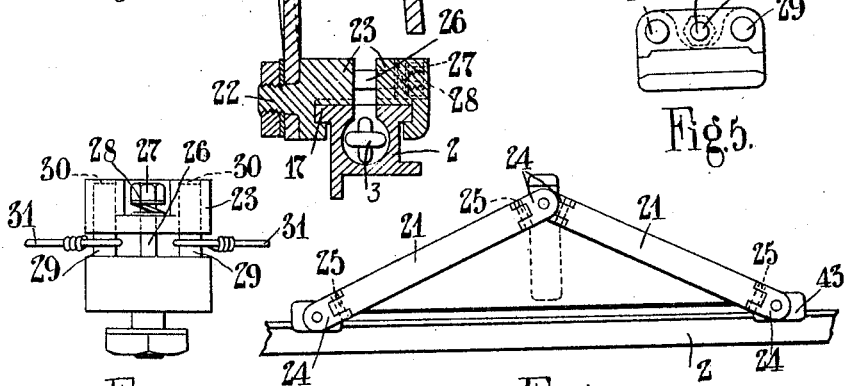

Patented Jan. 1, 1929.

1,697,073

UNITED STATES PATENT OFFICE.

FELIX JOHN LEATHER, OF WANDSWORTH, LONDON, ENGLAND.

HOOD FOR AUTOMOBILES AND OTHER VEHICLES.

Application filed July 16, 1926, Serial No. 122,977, and in Great Britain July 17, 1925.

This invention relates to hoods for automobile and other vehicles and has for its object broadly to provide an improved construction of hood of the kind in which cant rails are secured to the body of the vehicle and extend from the front to the rear thereof, a plurality of hood sticks for supporting a flexible covering being arranged to engage the cant rails whereby they will be supported when the hood is raised and endless flexible members being connected to the hood sticks for use in raising and lowering the hood.

The invention consists broadly in the connection of each of the hood sticks supporting the flexible material forming the greater part of the covering constituting the roof of the vehicle when the hood is raised on either side to a plurality of shoes engaging the cant rail on the adjacent side by means of links, all of which are pivotally connected with the related hood stick about a common centre.

Preferably, the links are connected with their shoes and the related hood sticks through the intermediary of substantially universal joints.

Conveniently the cant rails in accordance with the invention each extend from a member in front of the driving seat which is also adapted to function as the support for glass or like material acting as a wind-screen.

Optionally, the rear end of each cant rail and the lower end of the member forming the support for the wind-screen are provided with tubular extensions adapted to form guides for the flexible members whereby the hood is raised and lowered, such tubular extensions being located within the body of the vehicle and extending below the level of the doors thereof to means whereby motion may be imparted to the flexible members in raising and lowering the hood.

With this arrangement a winding handle or equivalent device is preferably located in the body of the vehicle adjacent to the driver's seat, the flexible members being led by the provision of suitable guiding means about a drum or equivalent device operated by the winding handle or the like.

The invention also comprises a hood construction in which cant rails are secured to the body of the vehicle and extend from the rear to the front thereof substantially directly above the sides of the body, and a plurality of hood sticks for supporting a flexible covering, said hood sticks being supported by the cant rails and associated with an endless flexible member whereby the hood may be raised and lowered and in which means are associated with the endless flexible member adapted to rotate a peak or flap element of the hood to bring its free edge into the forward position when the hood is fully raised and to return it into the rear position on lowering the hood.

Conveniently, for the purpose of rotating the peak or flap a rack is associated with each of the cant rails, a toothed wheel or wheels being associated with the peak or flap in such manner as to engage the rack.

Certain constructions in accordance with the invention are illustrated by way of example in the accompanying drawings, in which:—

Figure 1 is a side elevation of a construction in accordance with the invention;

Figure 2 is a view illustrating on a larger scale the means for rotating the peak or flap of the hood into and out of position;

Figure 3 is a view on a larger scale illustrating the means of connecting the hood sticks with shoes running on the cant rails;

Figure 4 being a view of the same at right angles to the plan of section of Figure 3;

Figure 5 is a view in elevation of one of the shoes;

Figure 6 being a plan view thereof.

In Figure 1 of the drawings 1 represents the body of the vehicle, 2 the cant rails which in the construction illustrated are so designed as to accommodate both the outward and return portions of the flexible members by means of which the hood is raised and lowered. These flexible members are indicated by the reference character 3.

In the construction illustrated the forward ends of the cant rails terminate in pillars 7 forming the support for the wind-screen; these pillars are provided with tubular extensions 8 which are continued along the body of the vehicle adjacent to the frame as also are corresponding tubular extensions 9 from the rear ends of the cant rails, such extensions operating to guide the flexible members whereby the hood is raised or lowered to the drums or sprockets 10 which are mounted on a spindle which is arranged to be rotated by the handle 11 through the medium of a sprocket 12 and chain 13, although, as will be understood, any other convenient driving means operated manually or mechanically as, for instance, by the engine through suitable clutch mechanism or from the starting motor, may be employed.

The flexible material of the hood is represented by the reference character 14, while the hood sticks 15 are furnished on either side, as shown in Figure 3, with a bracket 19 on a bolt 20 in which links 21 are pivoted, the other ends of these links being in turn pivotally connected with the shoes sliding on the cant rails at their opposite ends on a pin 22 provided on the split shoes 23 which engage flanges 17 on the cant rail. In the construction illustrated in Figure 4 the ends 24 of the links are pivotally connected with the body thereof by means of the pins 25 in order to provide a greater degree of flexibility and in fact to provide a substantially universal joint between the links and the related shoes and hood sticks. The two halves of each of the shoes, as will be seen, are connected together by means of a stud 26 between the nut 27 of which and the adjacent shoe a spring washer 28 is arranged to prevent chattering or rattle. In one half of the split shoe locating pins 29 are provided which engage in holes 30 in the other half of the shoe.

The several shoes on each side of the hood are connected together by flexible members 31 of spring steel, wire or steel tape, the length of which is so adjusted as to secure that when the hood is raised the several hood sticks are the proper distance apart and that the angle between the links connected to each hood stick is such as to maintain the flexible covering material sufficiently taut and to ensure the roof portion having the desired contour.

In addition the flexible material of the hood is buttoned or otherwise secured to the external halves of the shoes and by this means the edge of the hood is maintained taut.

The hood stick, or stay, adapted to support the rear angle of the hood is indicated in Figure 1 by the reference 32. At its outer end it is provided with a shaped support 33 to which the flexible material of the hood is secured and it is connected on either side with the adjacent cant rail by a shoe 34 on which a pin is provided engaging a slot 35 in the stay. The lower ends of this hood stick are pivotally connected at 36 with the levers 37 secured to some convenient point of the body by the pivots 38. Springs 39, one end of each of which is connected to a fixed point on the body, are associated with these levers and chains or cables 40 running over pulleys or sprockets 41, 42 are also connected with the levers and with the shoes 43 which in turn are connected with the flexible members by means of which the hood is raised in such manner that by the operation of lowering the hood the levers are caused to move through the path indicated by the dotted line 44 by reason of the tension of the spring 39.

The sprockets or pulleys over which the chains or cables connected with these levers travel may be provided with resilient supports adapted to take up any slack in the chains or cables.

In the construction illustrated in Figure 1 the hood stick supporting the hood at its rear angle and the flexible covering connected thereto will be brought forward on lowering the hood and both it and the remaining portion of the hood will be housed mainly within the chamber 45 provided in the back of the body.

The peak or flap 46 of the hood is preferably of rigid material and is connected through arms 47 with a spindle on which circular toothed elements 48 are mounted.

As the hood is erected, the circular toothed elements roll over the racks 49 associated with the cant rails and such motion causes the free edge of the peak or flap to move forward whereas when the hood is being lowered the motion of the said circular toothed members over the racks will cause the free edge of the peak to be moved in a rearward direction.

The construction of the flap is more clearly shown in Figure 2 of the drawings from which also its operation may be more easily followed.

If desirable or necessary the provision of tensioning means associated with the endless flexible member whereby the hood is raised and lowered may be provided. Thus, for instance, a spring of suitable strength may be interposed between the ends of the cable or chain of which the flexible member is formed.

Springs are conveniently provided in the shoes, and between them and the upper surface of the cant rail, in order to prevent rattle or chattering while providing a certain degree of flexibility in the bearing between these elements and similarly at other points, cushioning means may be provided.

Having now described my invention what I claim as new and desire to secure by Letters Patent is:—

1. A hood construction for automobile and other vehicles, comprising cant rails which are secured to the body of the vehicle and extend from the front to the rear thereof substantially directly above the sides of the body, a sheet of flexible material forming the roof portion and the back panel of the hood, a plurality of hood sticks adapted to support the flexible material constituting the roof portion, means connecting each end of each of said hood sticks with the cant rails located above either side of the body, each of said means comprising a plurality of links pivotally connected with the related hood stick about a common centre, and a shoe pivotally connected to each of said links and engaging the cant rails.

2. A hood construction for automobile and other vehicles, comprising cant rails which are secured to the body of the vehicle and extend from the front to the rear thereof substantially directly above the sides of the body, a sheet of flexible material forming the roof portion and the back panel of the hood, a plurality of hood sticks adapted to support the flexible material constituting the roof portion, means connecting each end of each of said hood sticks with the cant rails located above either side of the body, each of said means comprising a plurality of links pivotally connected with the related hood stick about a common centre, a shoe connected to each of said links, and a substantially universal joint between each link and its associated shoe.

3. A hood construction for automobile and other vehicles, comprising cant rails which are secured to the body of the vehicle and extend from the front to the rear thereof substantially directly above the sides of the body, a sheet of flexible material forming the roof portion and the back panel of the hood, a plurality of hood sticks adapted to support the flexible material constituting the roof portion, means connecting each end of each of said hood sticks with the cant rails located above either side of the body, each of said means comprising a plurality of links connected with the related hood stick about a common centre, a shoe connected to each of said links, and substantially universal joints forming the connections between the links and the related hood sticks and the links and the shoes.

In testimony whereof I have signed my name to this specification.

FELIX JOHN LEATHER.